(12) United States Patent
Hoppe et al.

(10) Patent No.: US 11,373,341 B2
(45) Date of Patent: Jun. 28, 2022

(54) METHOD FOR CONTROLLING A DEVICE, IN PARTICULAR, A PROSTHETIC HAND OR A ROBOTIC ARM

(71) Applicant: Hochschule Offenburg, Offenburg (DE)

(72) Inventors: Harald Hoppe, Achern (DE); Andreas Otte, Umkirch (DE); Simon Hazubski, Lahr (DE)

(73) Assignee: Hochschule Offenburg, Offenburg (DE)

( * ) Notice: Subject to any disclaimer, the term of this patent is extended or adjusted under 35 U.S.C. 154(b) by 0 days.

(21) Appl. No.: 16/836,746

(22) Filed: Mar. 31, 2020

(65) Prior Publication Data

US 2020/0327705 A1 Oct. 15, 2020

(30) Foreign Application Priority Data

Apr. 3, 2019 (DE) .......................... 102019108670.1

(51) Int. Cl.
*G06T 11/00* (2006.01)
*G06F 3/01* (2006.01)
(Continued)

(52) U.S. Cl.
CPC ............... *G06T 11/00* (2013.01); *G05D 3/20* (2013.01); *G06F 3/013* (2013.01); *G06T 7/20* (2013.01);
(Continued)

(58) Field of Classification Search
CPC . A61B 2017/00216; G06T 11/00; G06T 7/70; G06T 7/20; G06T 2200/24;
(Continued)

(56) References Cited

U.S. PATENT DOCUMENTS 5,684,531 A * 11/1997 Li ........................... H04N 7/18
348/139
9,652,047 B2 * 5/2017 Mullins ................... G06F 3/013
(Continued)

FOREIGN PATENT DOCUMENTS

JP 2007050461 A * 3/2007
WO 2018165047 A1 9/2018

OTHER PUBLICATIONS

Park et al., "Eye-controlled Human/Computer Interface Using the Line-of-Sight and the Intentional Blink", 1996, Computer ind. Engng, vol. 30, No. 3, pp. 463-473 (Year: 1996).*

(Continued)

*Primary Examiner* — Ryan R Yang
(74) *Attorney, Agent, or Firm* — The Culbertson Group, P.C.

(57) ABSTRACT

A method for controlling a device, in particular a prosthetic hand or a robotic arm, includes using an operator-mounted camera to detect at least one marker positioned on or in relation to the device. Starting from the detection of the at least one marker, a predefined movement of the operator together with the camera is detected and is used to trigger a corresponding action of the device. The predefined movement of the operator is detected in the form of a line of sight by means of camera tracking. A system for controlling a device, in particular a prosthetic hand or a robotic arm, includes a pair of AR glasses adapted to detect the at least one marker and to detect the predefined movement of the operator.

18 Claims, 3 Drawing Sheets

(51) Int. Cl.
- *H04N 5/225* (2006.01)
- *G06T 7/20* (2017.01)
- *G05D 3/20* (2006.01)
- *G06T 7/70* (2017.01)

(52) U.S. Cl.
CPC ............ *G06T 7/70* (2017.01); *H04N 5/2253* (2013.01); *G06T 2200/24* (2013.01); *G06T 2207/30204* (2013.01)

(58) Field of Classification Search
CPC . G06T 2207/30204; G05D 3/20; G06F 3/013; H04N 5/2253
See application file for complete search history.

(56) References Cited

U.S. PATENT DOCUMENTS

| | | | | |
|---|---|---|---|---|
| 10,166,122 | B2* | 1/2019 | Park | A61F 2/583 |
| 2004/0199288 | A1* | 10/2004 | Watanabe | G05B 19/425 |
| | | | | 700/245 |
| 2017/0136621 | A1* | 5/2017 | Benaim | G06F 3/013 |
| 2017/0177939 | A1* | 6/2017 | Beall | G06K 9/2063 |
| 2017/0245946 | A1* | 8/2017 | Tabandeh | A61B 90/37 |

OTHER PUBLICATIONS

McMullen, David P. et al., "Demonstration of a Semi-Autonomous Hybrid Brain-Machine Interface Using Human Intracranial EEG, Eye Tracking, and Computer Vision to Control a Robotic Upper Limb Prosthetic." IEEE Transactions on Neural Systems and Rehabilitation Engineering, vol. 22, No. 4, Jul. 2014.

Hales, Jeremy, et al, "Interacting with Objects in the Environment by Gaze and Hand Gestures," Proceedings of the 3rd international workshop on pervasive eye tracking and mobile eye-based interaction, 2013.

Zeng, Hong, et al., "Closed-loop hybrid gaze brain-machine interface based robotic arm control with augmented reality feedback," Frontiers in Neurorobotics, vol. 11, Article 60, 2017.

* cited by examiner

METHOD FOR CONTROLLING A DEVICE, IN PARTICULAR, A PROSTHETIC HAND OR A ROBOTIC ARM

TECHNICAL FIELD OF THE INVENTION

The invention relates to a method for controlling a device, in particular, a prosthetic hand or a robotic arm. Such methods are use in the field of controlling electrical neuro-prosthetic hands, for example.

BACKGROUND OF THE INVENTION

Current approaches for controlling neuroprosthetic hands are based on measuring electromyographic (EMG) signals from extant muscles or evaluating thought patterns by means of a brain-machine interface and deriving commands for the prosthesis therefrom.

In the field of neuroprosthetics, a complex system with which robotic prosthetic arms can be controlled has been implemented; see for example "David P. McMullen, et al. (Jul. 22, 2014). Demonstration of a Semi-Autonomous Hybrid Brain-Machine Interface Using Human Intracranial EEG, Eye Tracking, and Computer Vision to Control a Robotic Upper Limb Prosthetic. *IEEE TRANSACTIONS ON NEURAL SYSTEMS AND REHABILITATION ENGINEERING.*" In this case, a brain-machine interface was employed. Eye-tracking is used therein in order to select options. Such approaches are commonly found in the literature. In addition, conventional prostheses are often actuated with the aid of EMG signals.

These approaches have the drawback, however, that they are not very intuitive and must be laboriously learned by users or operators.

SUMMARY OF THE INVENTION

The present invention addresses the problem of creating a method for controlling a device, in particular a prosthetic hand or a robotic arm, which avoids the above-mentioned difficulties and enables a comfortable control. The invention also addresses the problem of enabling a problem-free and precise control of the device, in particular a prosthetic hand or a robotic arm, in a simple manner and thereby avoiding incorrect operations.

According to the invention, a user or an operator uses a camera, preferably mounted on the head, to control or actuate a robotic device by means of camera tracking. As used in this disclosure and the accompanying claims the designation "robotic device" may be, in particular an (arbitrarily activated, motorized) prosthetic hand or an (arbitrarily activated, motorized) robotic arm. For this purpose, markers such as LEDs are positioned on or in relation to the robotic device and are preferably detected or recognized (localized) by the camera inside a defined region of a defined line of sight, preferably a central line of sight.

Only when the line of sight has been directed substantially in the direction of the markers, or independently of the marker position, the line of sight has been directed to a predefined position (for example upper left), is recognition of this kind and thus actuation of the robotic device possible. This already makes it possible to easily avoid an unintentional actuation of the robotic device and thus an incorrect operation, and to ensure robust actuation.

The line of sight thus represents the viewing direction of the user or observer, this viewing direction being understood in keeping with the invention to mean the orientation of the user's visual field, more particularly the orientation of augmented reality (AR) glasses relative to the robotic device, and not the viewing direction of the eyes.

Furthermore, a feedback result is output according to the invention and displayed to an operator on an output unit only in case of a recognition of a marker or an orientation of the line of sight relative to the marker. Only under this condition can commands for controlling the robotic device be generated, so that the risk of incorrect operations is further reduced. These commands are generated according to the invention by recognizing (different) predefined movements of the operator (together with the camera), the movements of the operator effecting a corresponding movement of the line of sight (of the camera), preferably in a defined region that is recognized by means of camera tracking and used for triggering a corresponding action of the device.

Predefined movements in keeping with the invention are also understood to mean commands learned or refined during usage (by means of teach-in or AI algorithms, and so forth).

This control (actuation) of a robotic device is intuitive and easily learned by an operator through the use of body movements, more particularly head movements. In an advantageous configuration of the invention, the starting point from which movements are interpreted as control signals is made clear to the user by outputting a feedback result, so that the risk of unintentional incorrect operations is reduced or even excluded.

An audio output unit, a visual output unit (lamp, display screen, etc.) or a haptic output unit (pressure on the skin surface) for example, can be considered as an output unit in keeping with the invention.

In a preferred configuration of the invention, the camera is arranged on the operator's head in such a manner that the camera and thus the visual field of the camera, in particular the line of sight thereof, is moved along with a movement of the head.

For example, the camera of a pair of augmented reality (AR) glasses worn by an operator in order to control a robotic device can be used for this purpose. In this case, a display of the AR glasses can be used as the output unit, so that not only the head movement of an operator can be used for controlling the advice, but also feedback signals and possibly the movement of the line of sight can be comfortably displayed to an operator.

In this configuration of the invention, the camera is an integral part of the AR glasses, so that the line of sight, preferably the central line of sight, is defined in a fixed relation to the AR glasses. The position and orientation of the markers relative to the line of sight can be tracked by tracking the markers on the robotic device, such as a prosthetic hand for example.

In a further configuration of the invention, a window (that opens) in the AR glasses is used as the feedback result, and displayed in particular in the form of a virtual command field that is fixed (i.e. at a fixed position) relative to the position of the robotic device. The virtual command field is thus located in a spatially fixed relationship to the markers and is preferably shown when the line of sight is in a defined spatial proximity to the command field.

It is of course also possible for such a window to be permanently shown into the display of the AR glasses. A different action such as highlighting the window boundary, modifying the shading or background color of the window or other displays on the AR glass display can also be used as a feedback result.

In a window of this kind, not only information about the robotic device, but also the movements of the line of sight can be displayed inside the window in a comfortable manner to the user. The movement that has taken place can be displayed as feedback to the user, for example as a light track.

For example, different predefined lines, figures etc. can be displayed in this window together with information on the corresponding control commands to be executed (as a preliminary display) and, by appropriate head movement, the lines and figures can be followed by the operator with the concurrently displayed line of sight. It is also possible that movements of the line of sight can be recognized without such a preliminary display.

In a further configuration of the invention, eye tracking can additionally be used in order to enable further detail of the control commands or extension of the command set. For example, additional actions determined by eye tracking, such as blinking or the viewing direction of the operator, can be used for this purpose. It goes without saying that an additional camera, which is aimed at an eye of the operator rather than onto the surroundings, is necessary for such eye tracking. An eye tracking camera of this kind can preferably be a component of a pair of AR glasses.

The different configurations of the invention enable a simple and robust method with which the robotic device, such as a prosthesis, can be actuated. Because the device to be controlled and the actions thereof (for example the gripping operation of the prosthesis) are controlled visually by the operator, it is particularly advantageous that by using a camera arranged on the head, more particularly on a pair of AR glasses, and by camera tracking, a visual control mechanism is created, with which the robotic device can be controlled or actuated relative to the camera.

In a further configuration of the invention, eye tracking can additionally be used to trigger actions or control commands for the robotic device or to provide detail for actions already generated (by means of camera tracking). For this purpose, the eye orientation is observed by means of an additional camera for eye tracking and predefined actions such as blinking, a glance downwards, etc. are recognized in order to trigger corresponding actions for controlling the robotic device.

These and other advantages and features of the invention will be apparent from the following description of representative embodiments, considered along with the accompanying drawings.

DESCRIPTION OF REPRESENTATIVE EMBODIMENTS

Figure 1:
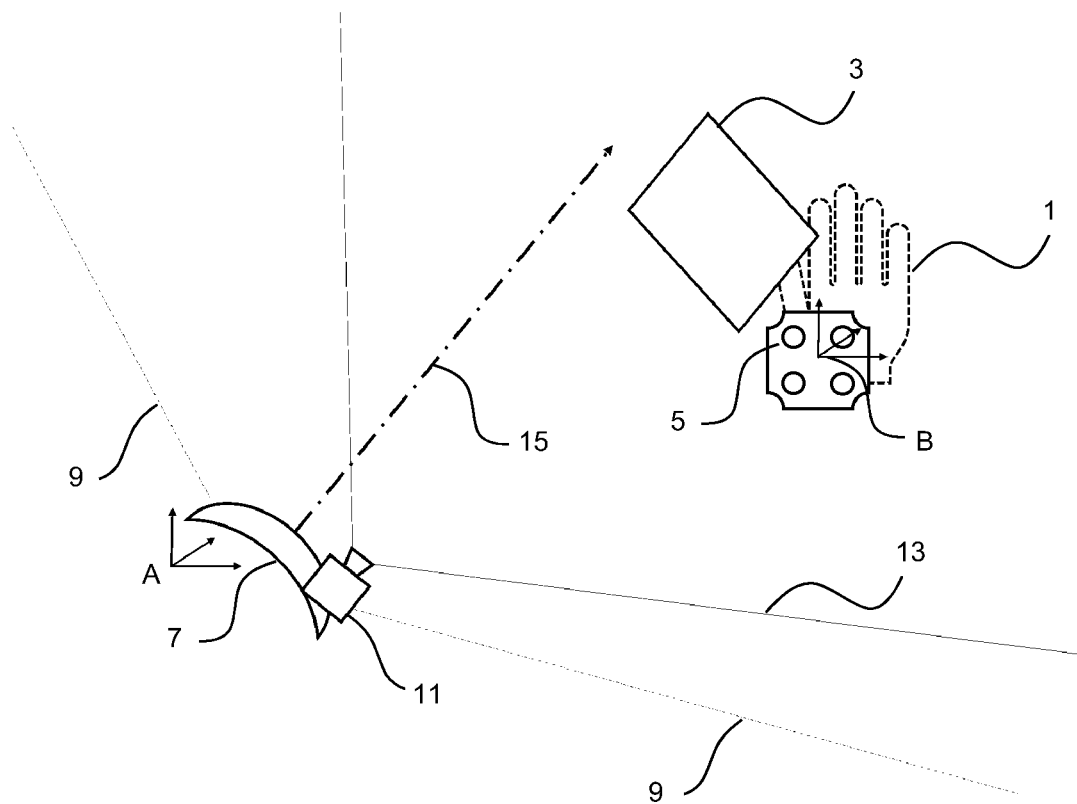
FIG. 1 shows a schematic representation of a user wearing AR glasses and having a prosthetic hand.

The prosthetic hand 1 shown in FIG. 1 as a non-limiting example of a robotic device to be controlled has a number (1-n) of markers, for example four markers 5 as shown, preferably in the form of LEDs, to be recognized, that is, detected, by a camera 11 in its position within a coordinate system B.

The camera 11 is worn by a user or an operator, for example as part of a pair of AR glasses 7, so that the position of the camera and thus the visual field 13 thereof changes in the coordinate system B with the movement of the visual field 9 of the user, more particularly brought about by a head movement.

If the prosthetic hand 1 having the markers 5 is in the visual field 13 of the camera, the markers 5 can be recognized. Insofar as the camera 11 mounted on the AR glasses 7 (or corresponding camera image evaluation software) sees or recognizes the markers 5, the position and orientation of the prosthesis can be determined with 2 to 6 degrees of freedom in the coordinate system A of the glasses 7 by tracking the position and orientation of the prosthesis, wherein the transformation between the coordinate system B of the prosthetic hand 1 and the coordinate system A of the viewer or the AR glasses 7 is determined by means of a suitable (trigonometric) algorithm. This creates the prerequisite for evaluating the viewing direction (line of sight 15) of the viewer or the user. The viewing direction of the user in keeping with the invention is to be understood to mean the orientation of the AR glasses 7 relative to the prosthetic hand 1 and not the viewing direction of the eyes.

In addition, movements of the prosthetic hand 1 can be recognized from the changes of position of the markers 5 detected by means of camera tracking and can be put into relation to the coordinate system A of the camera.

In a preferred use of the invention, the camera 11 has a large angle of aperture and thus a visual field 13 that is as large as possible (for example greater than or equal to 80°). The distance of the camera 11 or the AR glasses 7 from the markers 5 to be tracked is ordinarily less than one meter.

Within the visual field 9 of the viewer or the AR glasses 7, the line of sight 15, preferably central, is defined as the viewing direction, the direction of which line of sight changes according to a change of the visual field 13 of the camera 11 and thus the viewing direction of the user. Consequently, the viewing direction of the defined line of sight 15 can be determined from the movements of the glasses 7 relative to the prosthesis 1 or specified for the line of sight 15 as it moves in relation to the prosthetic hand 1. This creates the prerequisite for evaluating the viewing direction of the viewer.

Figure 2:
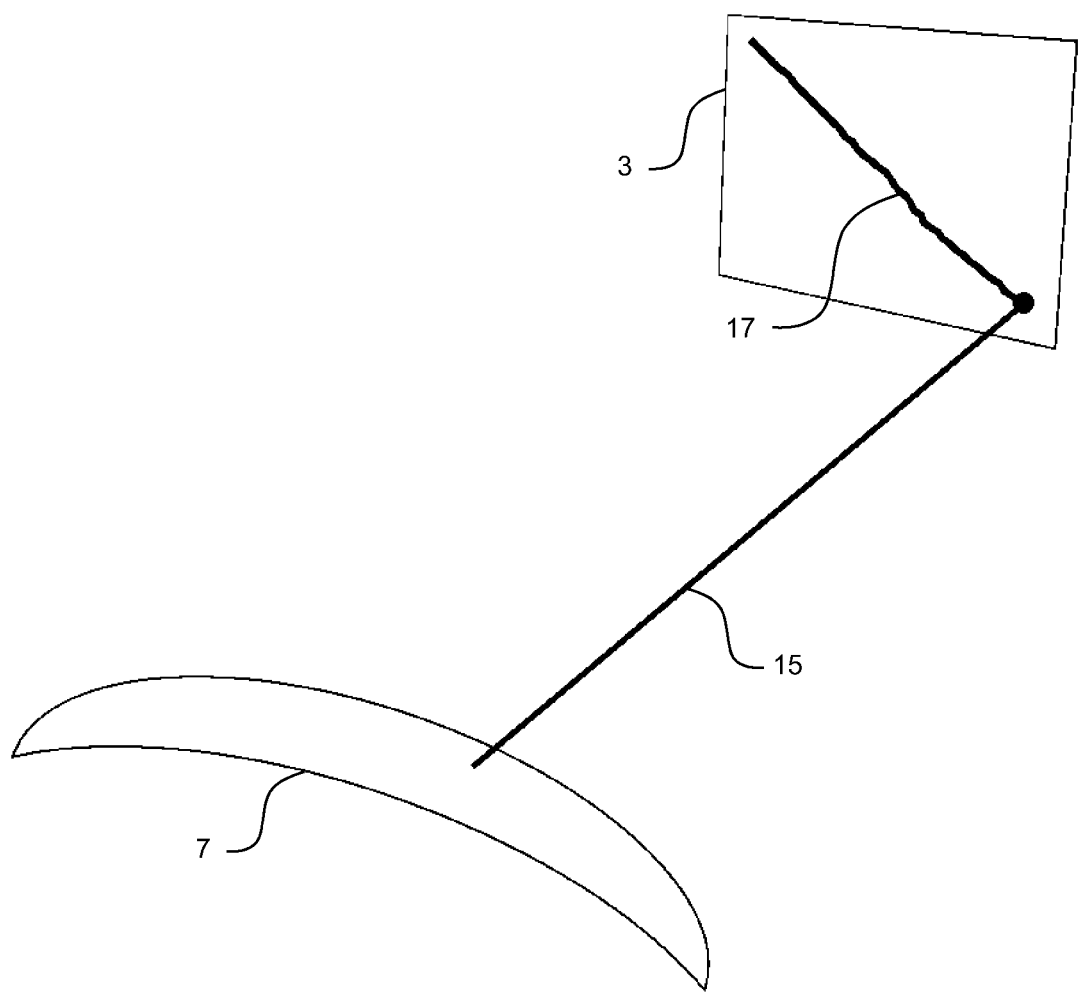
FIG. 2 shows an enlarged schematic representation of a cutout from FIG. 1.

If the line of sight 15 passes a defined region in the coordinate system B, a region near the marker 5 for example, or if markers 5 of a prosthesis 1 are detected inside the visual field 13 of the camera 11 or inside a predefined smaller section, for example a somewhat enlarged region around the line of sight 15, then as shown in FIG. 2, a window in the form of a visual command field 3 for a user (in a freely selectable size such as 10 to 15 cm from the view of the observer) is shown in the display of the AR glasses 7, preferably in the vicinity of the prosthesis. This command field 3 is located in the coordinate system B so that, from a movement of the user's visual field 9 and thus of the line of sight 15 (in the coordinate system A), a relative movement with respect to the two coordinate systems takes place.

The movements of the line of sight 15 on the command field 3 can be evaluated as explained below, for example by means of an appropriate evaluation device (including software) in order to determine a corresponding control command for the prosthesis 1.

As is evident from FIG. 2, the line of sight 15 can be moved by a movement of the visual field 9 of the user, more particularly by a head movement of the operator, on the command field 3, wherein the movement 17 of the line of sight 15 that has already occurred is preferably visible to the user on the command field 3, as an inclined line for example (from upper left to lower right), preferably in the form of a light track. Thereby the user receives feedback regarding his movements of the viewing direction or the line of sight 15 on the command field 3.

In this manner, certain figures can be drawn by a user, which are used for controlling the prosthetic hand 1.

For example, different simple figures such as lines of different orientation (horizontal from left to right, vertical from top to bottom, from the upper left to the lower right, from the lower left to the upper right and in the opposite direction, etc.), circles and the like can be predefined for different actions of the prosthesis 1. If a corresponding figure is drawn by a user in the command field 3 with the line of sight 15 and is recognized as such (within a predefined tolerance), then the action associated with the recognized figure is carried out and the prosthetic hand is appropriately actuated.

Examples of commands can be:
1. Movement from lower right-hand corner to upper left-hand corner→prosthesis opens hand completely.
2. Viewing direction of the viewer passes through command field from upper left-hand corner to lower right-hand corner only partially→prosthesis closes hand halfway.
3. Partial movement in opposite direction from 2.→prosthesis opens hand halfway.
4. Circular movement of viewing direction→move thumb.

It goes without saying that the commands can be individualized according to the functions of the prosthetic hand 1. For prosthetic hands that automatically shut off under a defined contact pressure, for example, merely the on-off command is sufficient.

Figure 3:
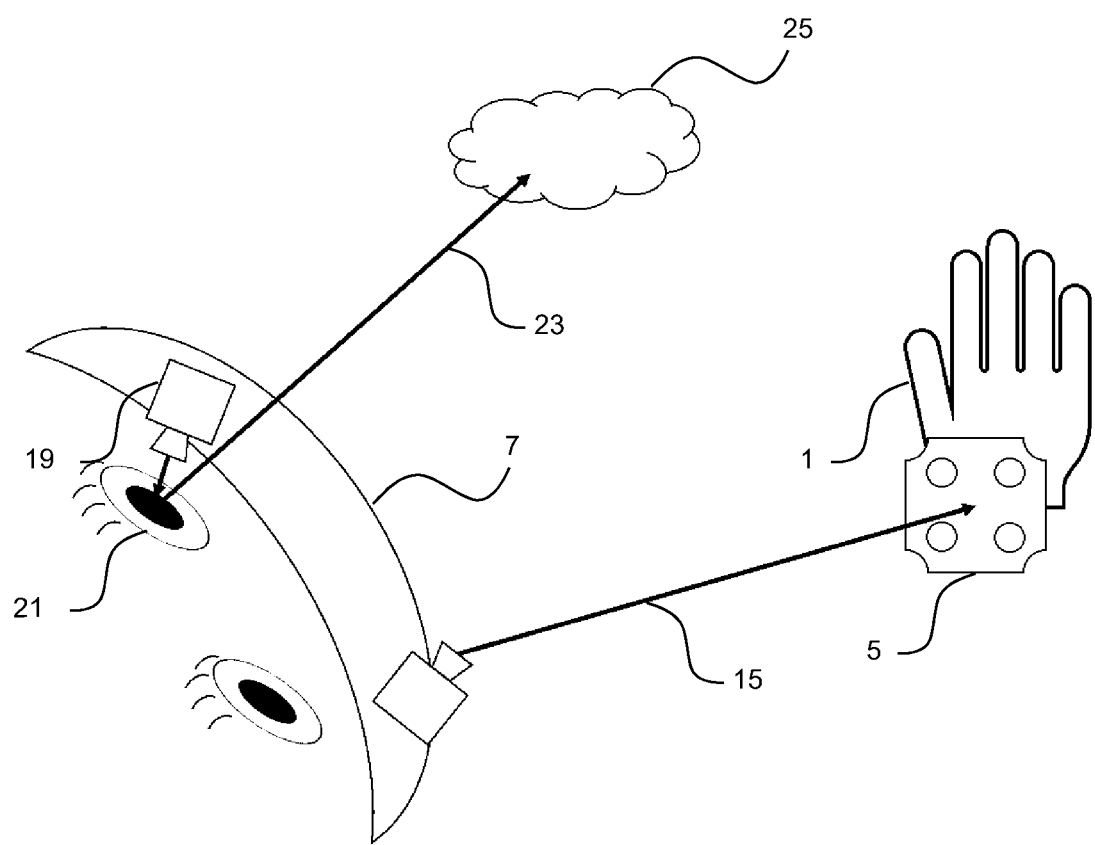
FIG. 3 shows a schematic representation according to FIG. 1 with additional eye tracking.

If drawing defined patterns within the command field 3 by movements of the head is not sufficient, the control of the prosthetic hand 1 can be extended by eye tracking, as shown in FIG. 3. By means of eye tracking, additional independent information can be determined, specifically the eye orientation 23; for example that of the left eye 21 of the user (shown only for better illustration on the basis of a direction to an object 25) and blinking of the eye 21. Thereby it is also possible to derive commands from the combination of the position of the prosthesis 1 and the eye orientation 23 of the eyes.

If the prosthesis is to be used as a replacement for a computer mouse, for example, movements of the prosthesis 1 can be converted directly into movements of the cursor. In this example of a computer mouse, the cursor position can be derived from the position of the prosthesis 1 and selection ("clicking") can be implemented by blinking or focusing the mouse pointer. A combination only for controlling the prosthesis 1 is of course also conceivable. For example, the prosthesis 1 could be moved by means of camera tracking and a closed hand could be opened by blinking, for example, to release an object held with the hand.

For certain patient groups as well (for example stroke patients or patients with amyotrophic lateral sclerosis, for whom head movements are only possible to limited extent) the eye tracking can be used in support of the camera tracking to control a prosthesis 1.

In order to implement the additional visual control, the AR glasses 7 have, as shown in FIG. 3, an additional eye tracker 19 directed to the left eye 21 or an eye tracking camera 19 in order to detect the eye orientation 23 and the blinking of the eye 21. The prosthesis 1 additionally bears the markers 5 in order to be able to determine the position of the prosthesis relative to the glasses 7. The displays near the prosthesis are not absolutely necessary in this approach, but are not out of the question and depend on the specific application case.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCE NUMBERS

1 Prosthetic hand
3 Virtual command field (display)
5 Marker
7 AR glasses
9 Visual field of the AR glasses
11 Camera
13 Visual field of the camera
15 Viewing direction of the user or the operator (line of sight)
17 Movement of the line of sight on the command field 3
19 Eye tracker (camera)
21 Left eye
23 Eye orientation
25 Object

The invention claimed is:

1. A method for controlling a robotic device, the method including:
(a) with a camera mounted on an operator, detecting when a line of sight associated with the operator is moved to a predefined position relative to at least one marker associated with the robotic device, wherein the camera is arranged on the head of the operator in such a manner that a movement of the head of the operator causes a corresponding movement of the camera and wherein the line of sight is defined in a position relative to a visual field of the camera so that only movement of the camera by the operator moves the line of sight;

(b) with the camera, tracking the movement of the camera to detect a predefined movement of the line of sight from the predefined position relative to the at least one marker; and (c) wherein the detected predefined movement of the line of sight correlates to a trigger for a corresponding action of the robotic device.

2. The method of claim 1 further including outputting a first feedback result to an output unit for the operator, the first feedback result indicating a detection of the at least one marker.

3. The method of claim 2 further including outputting a second feedback result to the output unit for the operator, the second feedback result indicating the detection of the predefined movement of the line of sight.

4. The method of claim 1 wherein the camera is arranged on the head of the operator in such a manner that the operator is outside of the visual field of the camera.

5. The method of claim 4 wherein the camera is mounted on a pair of AR glasses.

6. The method of claim 5 further including displaying a feedback result on a display device of the pair of AR glasses, the feedback result indicating one of a detection of the at least one marker and the detection of the predefined movement of the line of sight.

7. The method of claim 5 further including displaying a window on a display device of the AR glasses, the window being in a fixed window position relative to the position of the robotic device, the display of the window comprising a feedback result indicating a detection of the at least one marker.

8. The method of claim 7 further including displaying information about the robotic device in the window.

9. The method of claim 7 further including displaying a track of the predefined movement of the line of sight inside the window.

10. The method of claim 7 further including detecting an eye movement of the operator with an eye tracking camera and wherein the detected eye movement correlates to a control function for the robotic device.

11. A system for controlling a robotic device, the system including:

(a) at least one marker associated with a robotic device to be controlled;

(b) a camera adapted to be mounted on the head of an operator so that a visual field of the camera encompasses a line of sight associated with the operator and so that a movement of the head of the operator causes a corresponding movement of the camera, wherein the line of sight is defined in a position relative to the visual field of the camera so that only a movement of the camera by the operator moves the line of sight, the camera being adapted to (i) detect when the line of sight is moved to a predefined position relative to the at least one marker, and to (ii) responsive to detecting the line of sight being moved to the predefined position relative to the at least one marker, track movement of the camera together with the head of the operator to detect a predefined movement of the line of sight; and (c) wherein the detected predefined movement of the line of sight correlates to a trigger for a corresponding action of the robotic device.

12. The system of claim 11 further including a display device adapted to be mounted on the operator and wherein the display device is adapted to display a first feedback result on the display device responsive to detecting the line of sight being moved to the predefined position relative to the at least one marker.

13. The system of claim 12 wherein the display device is further adapted to display a second feedback result, the second feedback result indicating the detection of the predefined movement of the line of sight.

14. The system of claim 11 wherein the camera is mounted on a pair of AR glasses.

15. The system of claim 14 wherein a display device of the pair of AR glasses is adapted to display a feedback result indicating one of a detection of the at least one marker and the detection of the predefined movement of the line of sight.

16. The system of claim 15 wherein the display device of the pair of AR glasses is adapted to, responsive to the detection of the at least one marker, display a window in a fixed window position relative to the position of the robotic device.

17. The system of claim 16 wherein the display device of the pair of AR glasses is adapted to display information about the robotic device in the window.

18. The system of claim 17 wherein the display device of the pair of AR glasses is adapted to display a track of the predefined movement of the line of sight inside the window.

* * * * *